United States Patent
Chang et al.

(10) Patent No.: US 8,870,575 B2
(45) Date of Patent: Oct. 28, 2014

(54) LANGUAGE LEARNING SYSTEM, LANGUAGE LEARNING METHOD, AND COMPUTER PROGRAM PRODUCT THEREOF

(75) Inventors: Sen-Chia Chang, Hsinchu (TW); Hsien-Cheng Liao, Taipei (TW); Jiang-Chun Chen, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 688 days.

(21) Appl. No.: 12/900,482

(22) Filed: Oct. 8, 2010

(65) Prior Publication Data

US 2012/0034581 A1 Feb. 9, 2012

(30) Foreign Application Priority Data

Aug. 3, 2010 (TW) ................. 99125755 A (51) Int. Cl.
*G09B 19/06* (2006.01)
(52) U.S. Cl.
CPC ...................... *G09B 19/06* (2013.01)
USPC ........... 434/157; 434/156; 434/322; 434/350; 434/323
(58) Field of Classification Search
USPC .......................................... 434/156, 157, 185
See application file for complete search history.

(56) References Cited

U.S. PATENT DOCUMENTS

| | | | | |
|---|---|---|---|---|
| 2,556,152 A | * | 6/1951 | Cieslak .......................... | 251/319 |
| 5,487,671 A | * | 1/1996 | Shpiro et al. .................. | 434/185 |
| 5,679,001 A | * | 10/1997 | Russell et al. ................. | 434/185 |
| 5,793,891 A | * | 8/1998 | Takahashi et al. ............. | 382/228 |
| 5,832,441 A | * | 11/1998 | Aaron et al. .................... | 704/276 |
| 5,857,173 A | * | 1/1999 | Beard et al. .................... | 704/276 |
| 5,864,809 A | * | 1/1999 | Suzuki ........................... | 704/254 |
| 6,016,471 A | * | 1/2000 | Kuhn et al. ..................... | 704/266 |
| 6,055,498 A | * | 4/2000 | Neumeyer et al. ............. | 704/246 |
| 6,073,099 A | * | 6/2000 | Sabourin et al. ............. | 704/256.6 |
| 6,224,383 B1 | * | 5/2001 | Shannon ......................... | 434/156 |
| 6,317,716 B1 | * | 11/2001 | Braida et al. ................... | 704/275 |
| 6,691,090 B1 | * | 2/2004 | Laurila et al. .................. | 704/250 |
| 6,714,911 B2 | * | 3/2004 | Waryas et al. ................. | 704/271 |
| 7,324,941 B2 | * | 1/2008 | Choi et al. ..................... | 704/255 |
| 7,383,172 B1 | * | 6/2008 | Jamieson ........................... | 704/9 |
| 7,457,753 B2 | * | 11/2008 | Moran et al. ................... | 704/270 |
| 2002/0194002 A1 | | 12/2002 | Petrushin | |
| 2004/0067471 A1 | * | 4/2004 | Bennett .......................... | 434/167 |
| 2004/0166480 A1 | * | 8/2004 | Wen et al. ...................... | 434/156 |

(Continued)

FOREIGN PATENT DOCUMENTS

| | | |
|---|---|---|
| CN | 1956057 | 5/2007 |
| CN | 101010934 | 8/2007 |

(Continued)

*Primary Examiner* — Robert J Utama
(74) *Attorney, Agent, or Firm* — Jianq Chyun IP Office (57) ABSTRACT

A language learning system including a storage module, a feature extraction module, and an assessment and diagnosis module is provided. The storage module stores training data and an assessment decision tree generated according to the training data. The feature extraction module extracts pronunciation features of a pronunciation given by a language learner. The assessment and diagnosis module identifies a diagnosis path corresponding to the pronunciation of the language learner in the assessment decision tree and outputs feedback information corresponding to the diagnosis path. Thereby, the language learning system can assess and provide feedback information regarding words, phrases or sentences pronounced by the language learner.

22 Claims, 7 Drawing Sheets

(56) References Cited

U.S. PATENT DOCUMENTS

| | | | |
|---|---|---|---|
| 2005/0102139 A1* | 5/2005 | Fukada | 704/235 |
| 2007/0005357 A1* | 1/2007 | Moran et al. | 704/246 |
| 2007/0055523 A1 | 3/2007 | Yang | |
| 2008/0140453 A1* | 6/2008 | Poplinger et al. | 705/3 |
| 2008/0298549 A1* | 12/2008 | Quill et al. | 378/65 |
| 2009/0155751 A1* | 6/2009 | Paul et al. | 434/185 |

FOREIGN PATENT DOCUMENTS

| | | |
|---|---|---|
| CN | 101751919 | 6/2010 |
| TW | 556152 | 10/2003 |
| TW | 200719175 | 5/2007 |
| TW | 200849218 | 12/2008 |

\* cited by examiner

| Training data | First mean value | Second mean value | Third mean value | First difference value | Second difference value | Third difference value | Grade mark |
|---|---|---|---|---|---|---|---|
| a | a1 | a2 | a3 | a4 | a5 | a6 | good |
| b | b1 | b2 | b3 | b4 | b5 | b6 | bad |
| c | c1 | c2 | c3 | c4 | c5 | c6 | bad |
| d | d1 | d2 | d3 | d4 | d5 | d6 | good |
| ···· | ···· | ···· | ···· | ···· | ···· | ···· | ···· |

LANGUAGE LEARNING SYSTEM, LANGUAGE LEARNING METHOD, AND COMPUTER PROGRAM PRODUCT THEREOF

CROSS-REFERENCE TO RELATED APPLICATION

This application claims the priority benefit of Taiwan application serial no. 99125755, filed on Aug. 3, 2010. The entirety of the above-mentioned patent application is hereby incorporated by reference herein and made a part of this specification.

TECHNICAL FIELD

The disclosure relates to a language learning system, a language learning method, and a computer program product thereof.

BACKGROUND

Digital language learning materials and systems developed based on the information technology are becoming increasingly popular and widespread around the world. With limited teaching resources and regional restrictions, a region-free self-study mode is very much desired by language learners. By eliminating the pronunciation learning obstacle and providing techniques for assessing, diagnosing, and correcting pronunciations, a region-free language learning mode can be created and learning a new language is made easy and convenient.

In order to resolve aforementioned problem, language learning systems have been developed to provide a self-study channel to language learners. In such a language learning system, audio files are recorded by inviting professionals to read specific language textbooks. When a language learner inputs a pronunciation into the language learning system according to a prearranged textbook, the language learning system compares the audio files recorded by the professionals and the pronunciation of the language learner and analyzes the difference to give a mark. In addition, in some language learning systems, some physical features of the pronunciation of the learner are detected, and feedback information is provided according to language learning theories. Moreover, in some other language learning systems, the pronunciation of the language learner is assessed by using the Gaussian model or the Gaussian mixture model according to certain physical features of the pronunciation or through a pronunciation verification technique. In aforementioned pronunciation assessment techniques, an overall weighted assessment, a single mark, or a simple comparison result is usually provided. Thus, the language learner cannot obtain adequate feedback information and the corresponding correction information. Thereby, such language learning systems are undesired by language learners and hinder the development of the industry.

SUMMARY

A language learning system capable of diagnosing words or sentences pronounced by a language learner and providing corresponding feedback information is introduced herein.

An integrated language learning method capable of diagnosing words or sentences pronounced by a language learner and providing corresponding feedback information is introduced herein.

A computer program product capable of diagnosing words or sentences pronounced by a language learner and providing corresponding feedback information is introduced herein.

According to an exemplary embodiment of the present disclosure, a language learning system for assessing a pronunciation in a learning sentence is provided. The language learning system includes a storage module, a feature extraction module, and an assessment and diagnosis module. The storage module stores at least one assessment decision tree. The assessment decision tree has a plurality of decision paths, and each of the decision paths includes a plurality of decision nodes and is corresponding to at least one feedback information. The feature extraction module extracts at least one pronunciation feature of the pronunciation. The assessment and diagnosis module determines a diagnosis path corresponding to the pronunciation among the decision paths of the assessment decision tree according to the pronunciation feature of the pronunciation and outputs the feedback information corresponding to the diagnosis path.

According to an exemplary embodiment of the present disclosure, an integrated language learning method for assessing a pronunciation in a learning sentence is provided. The integrated language learning method includes storing at least one assessment decision tree, wherein the assessment decision tree has a plurality of decision paths, and each of the decision paths includes a plurality of decision nodes and is corresponding to at least one feedback information. The integrated language learning method further includes extracting at least one pronunciation feature of the pronunciation, determining a diagnosis path corresponding to the pronunciation among the decision paths of the assessment decision tree according to the pronunciation feature of the pronunciation, and outputting the feedback information corresponding to the diagnosis path.

As described above, an integrated language learning method and a language learning system are provided in exemplary embodiments of the present disclosure, wherein words and sentences pronounced by a language learner can be precisely diagnosed, and feedback information corresponding to each pronunciation can be provided.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1A:
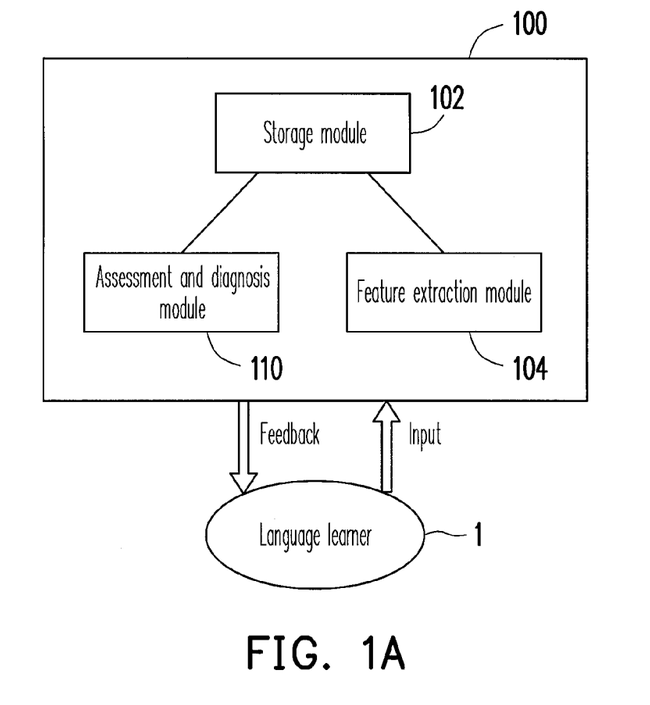
FIG. 1A is an application diagram of a language learning system according to an exemplary embodiment of the present disclosure.

FIG. 1A is an application diagram of a language learning system according to an exemplary embodiment of the present disclosure.

In order to diagnose the words and sentences pronounced by a language learner and provides corresponding feedback information regarding each pronunciation, the language learning system 100 in the present embodiment includes a storage module 102, a feature extraction module 104, and an assessment and diagnosis module 110. The storage module 102 stores an assessment decision tree, wherein the assessment decision tree has a plurality of decision paths, and each of the decision paths includes a plurality of decision nodes and is corresponding to at least one feedback information. The feature extraction module 104 extracts at least one pronunciation feature of a pronunciation. The assessment and diagnosis module 110 determines a diagnosis path corresponding to the pronunciation among the decision paths of the assessment decision tree according to the pronunciation feature of the pronunciation and outputs the feedback information corresponding to the diagnosis path. Accordingly, after a language learner 1 inputs the pronunciation through the feature extraction module 104, the assessment and diagnosis module 110 generates the appropriate feedback information according to the assessment decision tree in the storage module 102.

To be specific, the language learning system in the exemplary embodiment of the present disclosure constructs the corresponding assessment decision trees by collecting a plurality of pronunciations of a language learner as training sentences and analyzing the pronunciation features, such as the tones (for example, the $1^{st}$, $2^{nd}$, $3^{rd}$, and $4^{th}$ tones in Chinese) and intonations (for example, the accents, non-accents, unvoice phonemes, and silence in English) in these training sentences. Besides, when a language learner learns a language, the information on the assessment decision trees generated in the language learning system and the integrated language learning method provided by the present disclosure are used for assessing the pronunciations of the language learner and corresponding feedback information is provided to correct any incorrect pronunciation of the language learner.

While learning the Chinese language, to pronounce the different tones correctly is the most important part, especially to those language learners whose native languages are non-tonal languages. Below, the operation of the language learning system 100 will be further explained by taking tone learning as an example. However, it should be understood that the present disclosure is not limited herein. In another exemplary embodiment of the present disclosure, the language learning system 100 may also be applied to the learning of intonations and pronunciations in other languages, such as English, French, and Japanese.

Figure 1B:
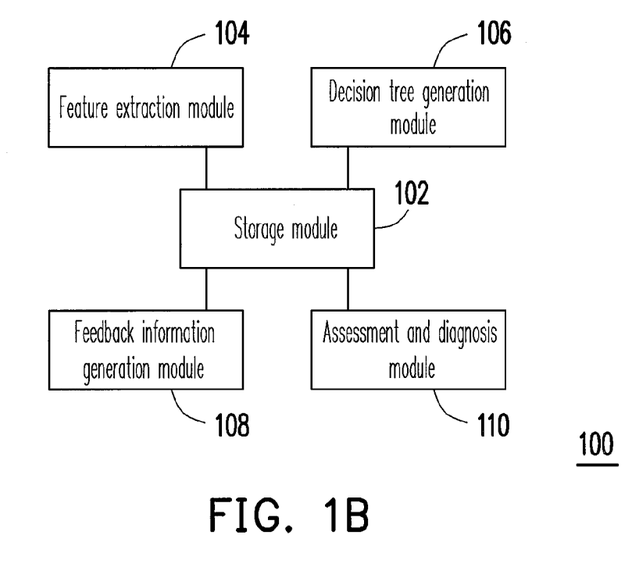
FIG. 1B is a schematic block diagram of a language learning system according to an exemplary embodiment of the present disclosure.

FIG. 1B is a schematic block diagram of a language learning system according to an exemplary embodiment of the present disclosure.

Referring to FIG. 1, the language learning system 100 includes the storage module 102, the feature extraction module 104, a decision tree generation module 106, a feedback information generation module 108, and the assessment and diagnosis module 110.

The storage module 102 stores a plurality of training sentences. To be specific, in the present exemplary embodiment, a plurality of training sentences is collected by recording learning texts read by 16 language learners whose native languages are not Chinese by using a recording module (not shown), and the collected training sentences are stored in the storage module 102. The storage module 102 may be a non-volatile memory, a CD-ROM, or a CD-RW.

The feature extraction module 104 performs a phonetic segmentation operation on the training sentences stored in the storage module 102 to obtain the time range (for example, the time duration of each word) of each pronunciation unit in the training sentences and categorize the pronunciation units according to the four tones (i.e., the $1^{st}$, $2^{nd}$, $3^{rd}$, and $4^{th}$ tones in Chinese). For example, the feature extraction module 104 categorizes the pronunciation units according to the tone of each pronunciation unit and the next pronunciation unit in the corresponding training sentence. To be specific, taking pronunciation units of the $1^{st}$ tone as an example, the pronunciation units can be categorized into a combination of a $1^{st}$-tone pronunciation unit and a $1^{st}$-tone pronunciation unit, a combination of a $1^{st}$-tone pronunciation unit and a $2^{nd}$-tone pronunciation unit, a combination of a $1^{st}$-tone pronunciation unit and a $3^{rd}$-tone pronunciation unit, a combination of a $1^{st}$-tone pronunciation unit and a $4^{th}$-tone pronunciation unit, and a combination of a $1^{st}$-tone pronunciation unit and a silence according to the tones of the next pronunciation units in the training sentences. Namely, the same $1^{st}$-tone pronunciation unit may vary with the tone of the next pronunciation unit in a sentence. Accordingly, each pronunciation unit in the Chinese language can be categorized into 20 different types (i.e., each word is pronounced in four tones, and each tone thereof is further divided into 5 types). However, it should be understood that the categorization of the pronunciation units in the present disclosure is not limited to foregoing description. In another exemplary embodiment of the present disclosure, the pronunciation units may also be categorized according to the tones thereof and the previous pronunciation units in the corresponding training sentences. Or, the pronunciation units may also be categorized according to the tones thereof and the previous and next pronunciation units in the corresponding training sentences. Or, the pronunciation units may also be categorized simply according to the tones thereof. Herein the pronunciation units extracted from the training sentences are referred to as training data, and each category is referred to as a training data group. Namely, a categorized training data belongs to one of the training data groups.

It should be mentioned that the training data collected from the language learners respectively has a grade mark. Namely, each training data is assigned a mark based on the correctness of the pronunciation thereof. In the present exemplary embodiment, each training data is marked as "good" or "bad". However, the present disclosure is not limited thereto, and in another exemplary embodiment of the present disclosure, the grade marks may also be numbers. For example, each training data is marked between 0-10 based on the correctness thereof. In yet another exemplary embodiment of the present disclosure, the grade marks may be assessed by an expert system or a professional.

In the present exemplary embodiment, the feature extraction module 104 extracts a plurality of pronunciation features corresponding to each training data. To be specific, the feature extraction module 104 extracts a fundamental frequency contour regarding the final segments of the syllables in each training data and normalizes the fundamental frequency contour. For example, the feature extraction module 104 obtains the maximum and minimum values within the fundamental frequency range of the training data of an entire sentence and normalizes the fundamental frequency of the training data to be between 1 and 5 according to the obtained values. However, the normalization technique is not limited in the present disclosure. In another exemplary embodiment of the present disclosure, the fundamental frequency contour may also be normalized by obtaining the maximum and minimum values of the fundamental frequency range of all the training data collected from the same person. Particularly, the feature extraction module 104 further extracts corresponding pronunciation features from the normalized fundamental frequency contour. For example, the feature extraction module 104 equally divides the fundamental frequency contour into three sub fundamental frequency contours and calculates the mean value of each sub fundamental frequency contour and the difference values between the sub fundamental frequency contours in the training data.

FIGS. 2-5 illustrate typical fundamental frequency contours of four tones and the corresponding pronunciation features according to an exemplary embodiment of the present disclosure.

Figure 2:
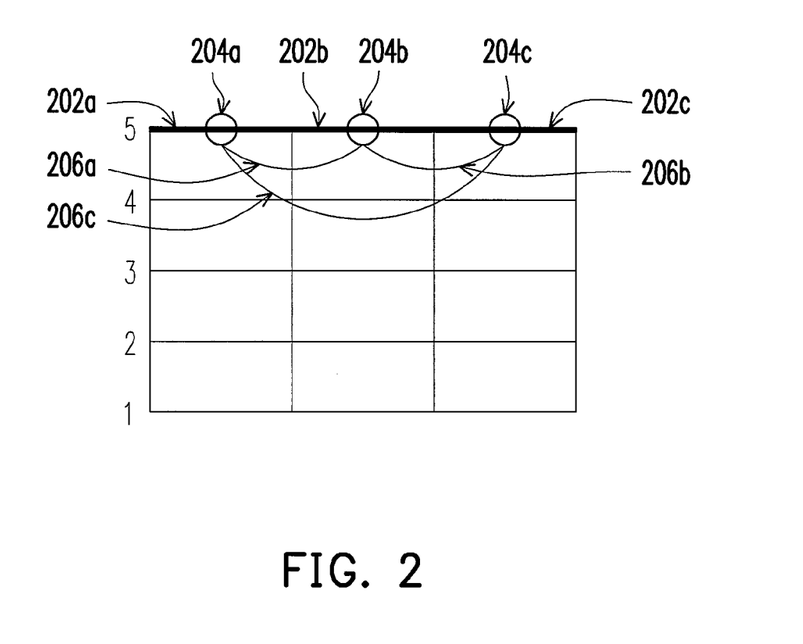
FIGS. 2-5 illustrate tone variations and the corresponding pronunciation features according to an exemplary embodiment of the present disclosure.

Referring to FIG. 2, taking a $1^{st}$-tone training data as an example, the bold line in FIG. 2 indicates the typical fundamental frequency contour of the $1^{st}$-tone training data. The feature extraction module 104 equally divides the fundamental frequency contour into a first sub fundamental frequency contour 202a, a second sub fundamental frequency contour 202b, and a third sub fundamental frequency contour 202c and calculates a first mean value (mean1) 204a of the first sub fundamental frequency contour 202a, a second mean value (mean2) 204b of the second sub fundamental frequency contour 202b, and a third mean value (mean3) 204c of the third sub fundamental frequency contour 202c. Besides, the feature extraction module 104 also calculates a first difference value (diff1) 206a between the first mean value 204a and the second mean value 204b, a second difference value (diff2) 206b between the second mean value 204b and the third mean value 204c, and a third difference value (diff3) 206c between the first mean value 204a and the third mean value 204c. In the present exemplary embodiment, the first mean value 204a, the second mean value 204b, the third mean value 204c, the first difference value 206a, the second difference value 206b, and the third difference value 206c in the fundamental frequency contour of the training data in FIG. 2 are used as the pronunciation features of the training data in FIG. 2.

Figure 3:
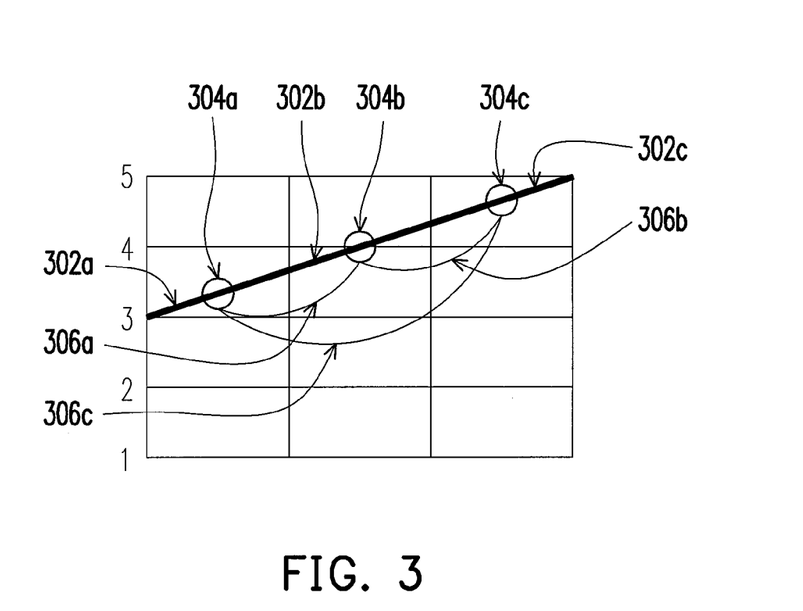

Referring to FIG. 3, taking a $2^{nd}$-tone training data as an example, the bold line in FIG. 3 indicates the typical fundamental frequency contour of the $2^{nd}$-tone training data. Similarly, the feature extraction module 104 equally divides the fundamental frequency contour into a first sub fundamental frequency contour 302a, a second sub fundamental frequency contour 302b, and a third sub fundamental frequency contour 302c and calculates a first mean value 304a, a second mean value 304b, a third mean value 304c, a first difference value 306a, a second difference value 306b, and a third difference value 306c of the fundamental frequency contour as the pronunciation features of the training data in FIG. 3.

Figure 4:
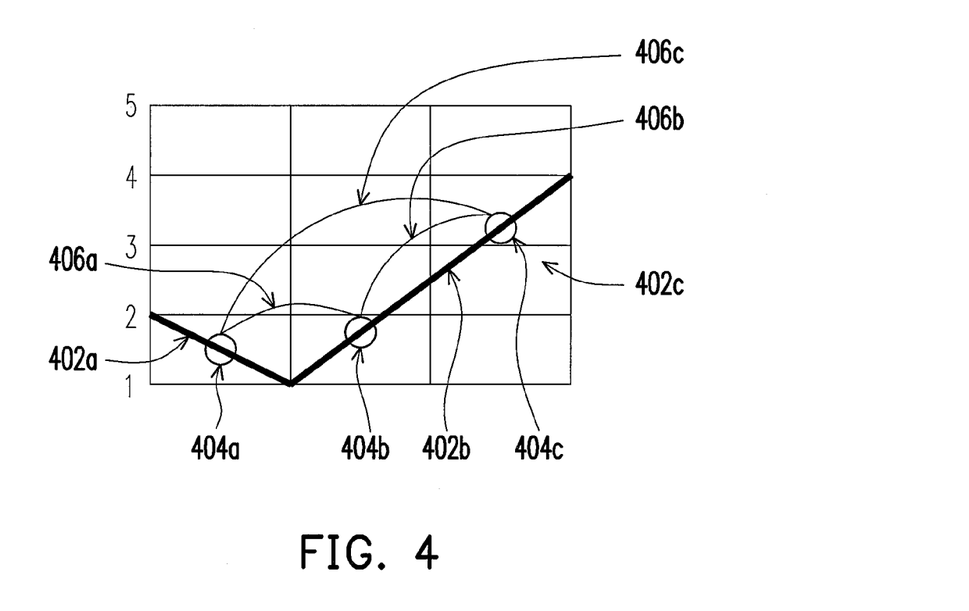

Referring to FIG. 4, taking a $3^{rd}$-tone training data as an example, the bold line in FIG. 4 indicates the typical fundamental frequency contour of the $3^{rd}$-tone training data. Similarly, the feature extraction module 104 equally divides the fundamental frequency contour into a first sub fundamental frequency contour 402a, a second sub fundamental frequency contour 402b, and a third sub fundamental frequency contour 402c and calculates a first mean value 404a, a second mean value 404b, a third mean value 404c, a first difference value 406a, a second difference value 406b, and a third difference value 406c of the fundamental frequency contour as the pronunciation features of the training data in FIG. 4.

Figure 5:
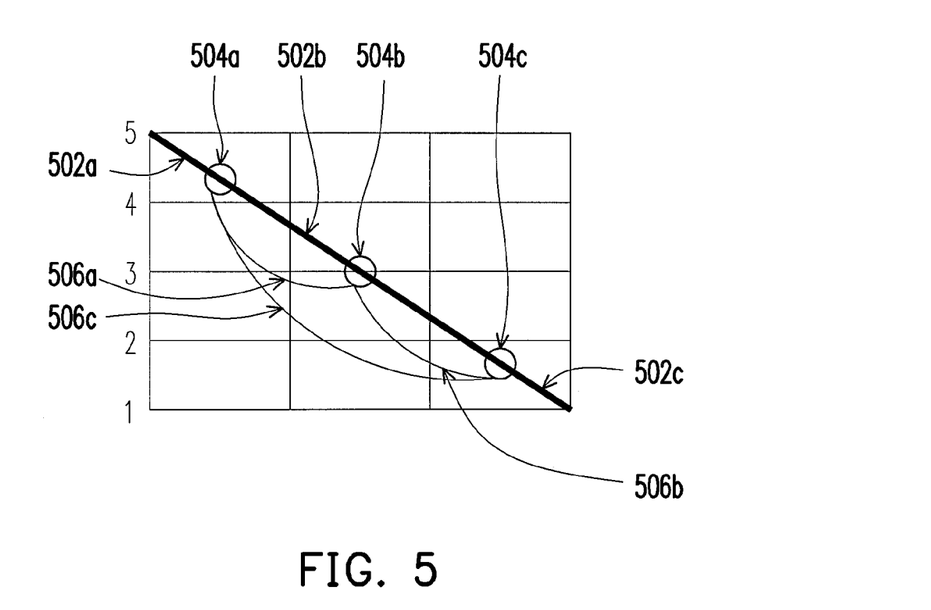

Referring to FIG. 5, taking a $4^{th}$-tone training data as an example, the bold line in FIG. 5 indicates the typical fundamental frequency contour of the $4^{th}$-tone training data. Similarly, the feature extraction module 104 equally divides the fundamental frequency contour into a first sub fundamental frequency contour 502a, a second sub fundamental frequency contour 502b, and a third sub fundamental frequency contour 502c and calculates a first mean value 504a, a second mean value 504b, a third mean value 504c, a first difference value 506a, a second difference value 506b, and a third difference value 506c of the fundamental frequency contour as the pronunciation features of the training data in FIG. 5.

In the example illustrated in FIGS. 2-5, the feature extraction module 104 extracts the pronunciation features corresponding to each training data. Namely, each training data has 6 pronunciation features. However, it should be understood that the present disclosure is not limited thereto, and any combination of the first mean values, the second mean values, the third mean values, the first difference values, the second difference values, and the third difference values in the fundamental frequency contour can be served as the pronunciation features. Additionally, in another exemplary embodiment of the present disclosure, the feature extraction module 104 may also calculate the slope of each sub fundamental frequency contour, and any combination of the first mean values, the second mean values, the third mean values, the first difference values, the second difference values, the third difference values, and the slopes in the fundamental frequency contour may be served as the pronunciation features.

It should be mentioned that in the present exemplary embodiment, the feature extraction module 104 extracts the pronunciation features from the fundamental frequency contour of the training data. However, the present disclosure is not limited thereto, and the feature extraction module 104 may also extract the corresponding pronunciation features from the energy contour, the mel-scale frequency cepstral coefficients (MFCCs), and the durations of the training data. In another exemplary embodiment of the present disclosure, the feature extraction module 104 may extract the first mean values, the second mean values, the third mean values, the first difference values, the second difference values, and the third difference values in the energy contour of the training data through a technique similar to that illustrated in FIGS. 2-5. In yet another exemplary embodiment of the present disclosure, the feature extraction module 104 extracts a plurality of phonemes of the training data and MFCCs corresponding to the phonemes, calculates a MFCC mean value of each phoneme and MFCC difference values between the MFCC mean values, and serves the MFCC mean values and/or the MFCC difference values of the training data as the pronunciation features of the training data. In still another exemplary embodiment of the present disclosure, the feature extraction module 104 extracts a plurality of phonemes of the training data and durations corresponding to the phonemes, calculates a mean duration of each phoneme and duration differences between the mean durations, and serves at least one of the mean durations and the duration differences of the training data as the pronunciation features of the training data. Moreover, in yet still another exemplary embodiment of the present disclosure, the feature extraction module 104 may also serve at least one or a combination of the fundamental frequency, the energy, the MFCCs, and the durations as the pronunciation features of the training data.

In an exemplary embodiment of the present disclosure, the feature extraction module 104 stores the categorized training data and the pronunciation features of the training data in the storage module 102.

The decision tree generation module 106 generates an assessment decision tree. To be specific, the decision tree generation module 106 generates the corresponding assessment decision tree according to the training data groups categorized by the feature extraction module 104 and the pronunciation features and grade marks of the training data in the training data groups. For example, as described above, the feature extraction module 104 categorizes the training data into 20 training data groups according to the tones thereof and the tones of the next pronunciation units, and the decision tree generation module 106 establishes an assessment decision tree for each training data group. In the present exemplary embodiment, the decision tree generation module 106 generates each assessment decision tree by using the C4.5 algorithm among the decision tree algorithm. However, it should be understood that the present disclosure is not limited thereto, and in another exemplary embodiment of the present disclosure, the decision tree generation module 106 may also generate each assessment decision tree by using the ID3 algorithm, the C5 algorithm, or any other suitable algorithm.

Figure 6:
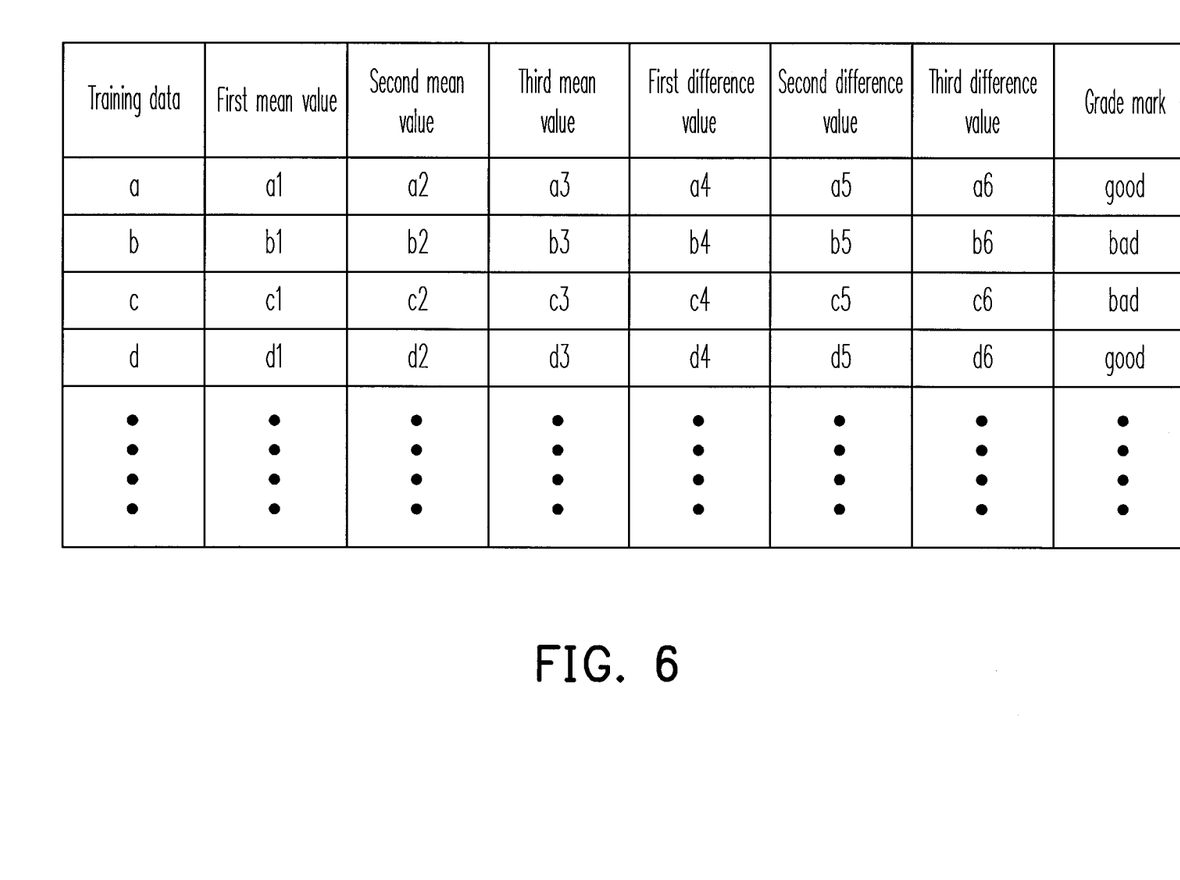
FIG. 6 illustrates an example of training data for generating an assessment decision tree according to an exemplary embodiment of the present disclosure.
Figure 7:
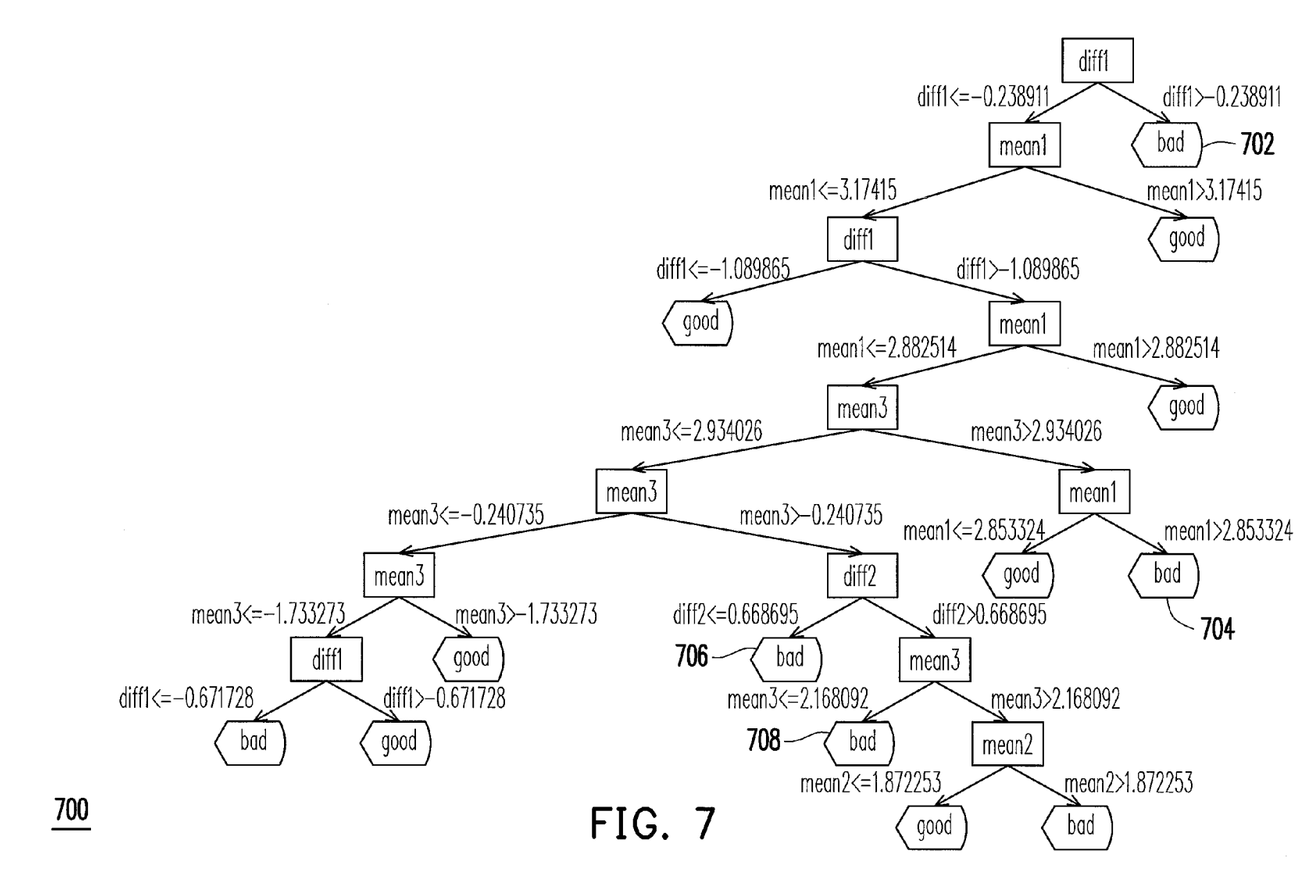
FIG. 7 illustrates a partial assessment decision tree according to an exemplary embodiment of the present disclosure.

FIG. 6 illustrates an example of training data for generating an assessment decision tree according to an exemplary embodiment of the present disclosure, and FIG. 7 illustrates a partial assessment decision tree according to an exemplary embodiment of the present disclosure. The example illustrated in FIG. 6 and FIG. 7 is described by assuming that the training data has a $4^{th}$-tone pronunciation and the next pronunciation unit in the corresponding sentence is silence.

Referring to FIG. 6, the decision tree generation module 106 reads the training data in the corresponding training data group (i.e., a $4^{th}$-tone pronunciation unit and the next pronunciation unit in the corresponding sentence is silence, such as the training data a, b, c, and d, etc.) and the pronunciation features and grade marks of the training data from the storage module 102. After that, the decision tree generation module 106 generates the assessment decision tree according to the pronunciation features and the grade marks of the training data (as shown in FIG. 7).

Referring to FIG. 7, the assessment decision tree 700 is composed of a plurality of decision nodes and a plurality of decision paths. Decision tree training is one technique of data mining. A decision tree describes a tree structure, and different types of objects are categorized according to their attributes by branches of the decision tree. Namely, a decision tree tests data division according to attributes of the data, and a data is determined to belong to a specific type when the data cannot be further divided. The generation and operation mechanisms of a decision tree are well-known techniques and related technical concepts can be understood by referring to related textbooks therefore will not be described herein.

Referring to FIG. 1 again, the feedback information generation module 108 analyzes the assessment decision tree generated by the decision tree generation module 106 and sets feedback information corresponding to the decision nodes on each decision path according to the pronunciation features on the decision nodes.

To be specific, the feature extraction module 104 extracts pronunciation features (i.e., the first mean value, the second mean value, the third mean value, the first difference value, the second difference value, and the third difference value of the fundamental frequency contour) according to physical pronunciation features. Accordingly, when the decision tree generation module 106 generates the assessment decision tree according to the pronunciation features, the decision paths and decision nodes on the assessment decision tree represent a specific type of pronunciations. Thus, the feedback information generation module 108 analyzes the decision nodes corresponding to each decision path according to the pronunciation features so as to identify the incorrect pronunciation type represented by the decision nodes.

Taking the assessment decision tree 700 as an example, according to the decision path from the root node to the decision node 702, the pronunciations corresponding to the decision node 702 belong to the category of "the first difference value is greater than −0.238911", which represents an incorrect pronunciation type of "descend not enough". According to the decision path from the root node to the decision node 704, the pronunciations corresponding to the decision node 704 belong to the category of "the first mean value is greater than 2.853324 and is smaller than or equal to 2.882541, the third mean value is greater than 2.934026, and the first difference value is greater than −1.089865 and is smaller than or equal to −0.238911", which represents an incorrect pronunciation type of "similar to the $1^{st}$ tone, your pitch ended too high". According to the decision path from the root node to the decision node 706, the pronunciations corresponding to the decision node 706 belong to the category of "the first mean value is smaller than or equal to 2.882514, the first difference value is smaller than or equal to −0.238911 and is greater than −1.089865, the third mean value is smaller than or equal to 2.934026 and is greater than −0.240735, and the second difference value is smaller than or equal to 0.668695", which represents an incorrect pronunciation type of "similar to the $3^{rd}$ tone, descent first and then ascent". According to the decision path from the root node to the decision node 708, the pronunciations corresponding to the decision node 708 belong to the category of "the first mean value is smaller than or equal to 2.882514, the first difference value is smaller than or equal to −0.238911 and is greater than −1.089865, the third mean value is smaller than or equal to 2.168092 and is greater than −0.240735, and the second difference value is greater than 0.668695", which represents an incorrect pronunciation type of "your pitch started too low, descend not enough".

Accordingly, the feedback information generation module 108 sets the feedback information corresponding to each decision path according to the pronunciation features of the decision nodes on the decision path. For example, in the present exemplary embodiment, a text description corresponding to the incorrect pronunciation type is used as the feedback information of the corresponding decision path. However, the present disclosure is not limited thereto, and in another exemplary embodiment of the present disclosure, the feedback information generation module 108 may also use gesture indication (for example, indicate whether the tone should ascend or descend with a gesture), visual illustration (for example, indicate whether the tone should ascend or descend with a picture), or correct pronunciation sample (for example, demonstrate the correct tone with a pronunciation) as the feedback information of the corresponding decision path.

In an exemplary embodiment of the present disclosure, the decision tree generation module 106 and the feedback information generation module 108 generates an assessment decision tree corresponding to each tone type (i.e., aforementioned 20 training data groups), sets the feedback information in the assessment decision trees, and stores the assessment decision trees in the storage module 102.

The assessment and diagnosis module 110 determines a diagnosis path corresponding to a pronunciation input by a language learner among the decision paths of the corresponding assessment decision tree according to the pronunciation features of the input pronunciation, and the assessment and diagnosis module 110 outputs the feedback information and grade marks corresponding to the decision nodes on the diagnosis path. Namely, the language learner may learn the language by using the language learning system 100 after the decision tree generation module 106 and the feedback information generation module 108 finishes generating the assessment decision trees and setting the corresponding feedback information.

For example, when the language learner speaks a Chinese word, a Chinese phrase, or a Chinese sentence through the recording module (not shown) of the language learning system 100, the feature extraction module 104 performs a phonetic segmentation operation on the pronunciation of the learning sentence to obtain each pronunciation unit (for example, the pronunciation of each word) in the learning sentence and categorizes the pronunciation units according to the tone thereof and the tone of the next pronunciation unit. Besides, the feature extraction module 104 extracts the pronunciation features (i.e., the first mean value, the second mean value, the third mean value, the first difference value, the second difference value, and the third difference value of the fundamental frequency contour) of each pronunciation in the learning sentence. Then, the assessment and diagnosis module 110 identifies the decision path (i.e., the diagnosis path) corresponding to the pronunciations in the corresponding assessment decision tree according to the pronunciation features of each pronunciation and outputs the feedback information and the grade marks corresponding to the decision path.

Figure 8:
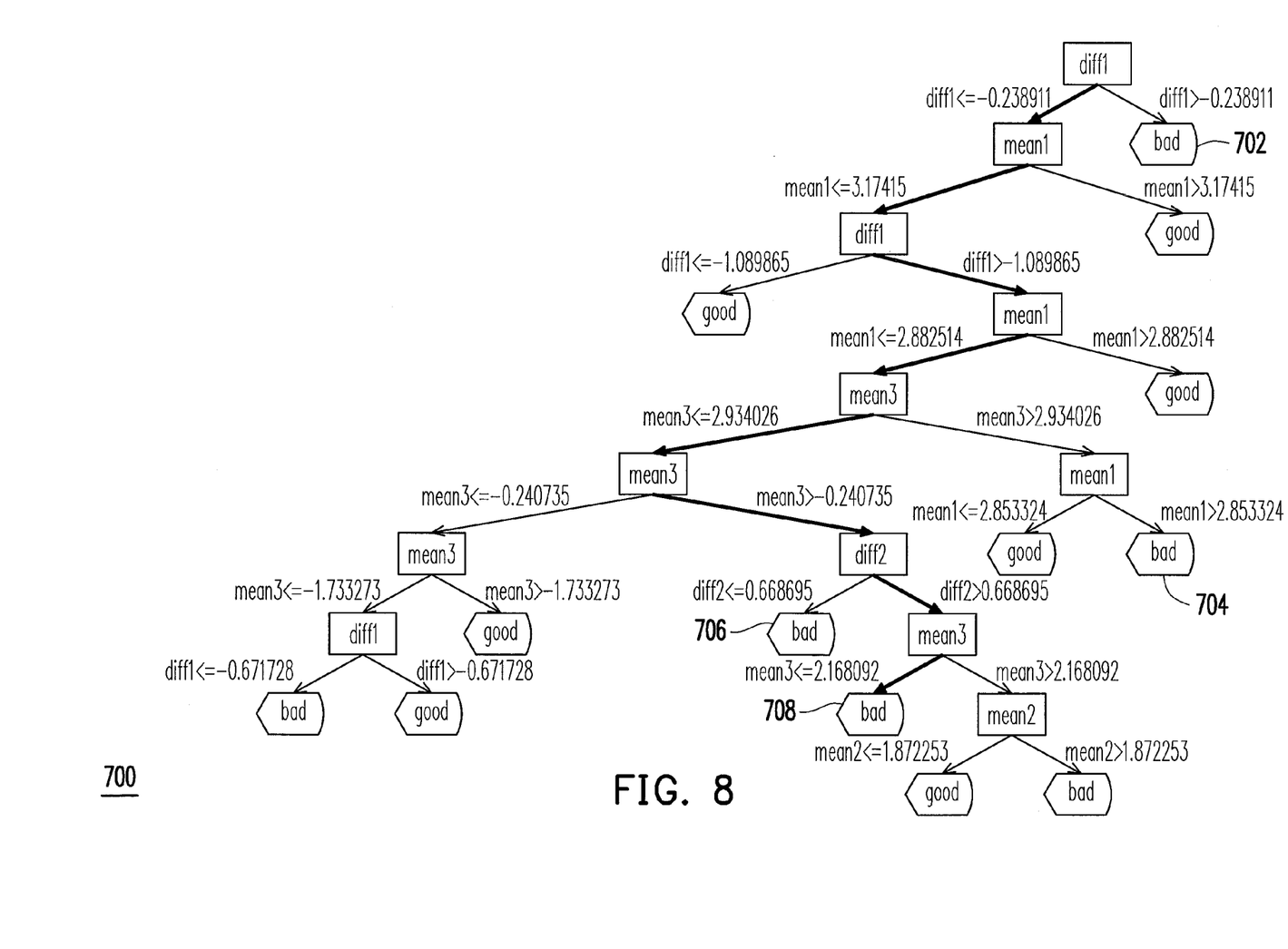
FIG. 8 is a diagram illustrating a diagnosis path according to an exemplary embodiment of the present disclosure.

For example, when a pronunciation in the learning sentence input by the language learner is a $4^{th}$-tone pronunciation unit and the next pronunciation unit in the learning sentence is silence, to diagnose the pronunciation, the assessment and diagnosis module 110 loads the corresponding assessment decision tree 700 from the storage module 102, determines a decision path corresponding to the pronunciation according to the pronunciation features of the pronunciation, and outputs the corresponding feedback information to the language learner. For example, when the diagnosis path (the diagnosis path indicated by the bold line in FIG. 8) is the decision path from the root node to the decision node 708, the assessment and diagnosis module 110 outputs the feedback information of "your pitch started too low, descend not enough" and a grade mark of "bad" to the language learner.

Namely, after the decision tree generation module 106 and the feedback information generation module 108 finish generating the assessment decision trees and setting the corresponding feedback information, the language learning system 100 in the exemplary embodiment of the present disclosure is capable of diagnosing the words, phrases, or sentences spoken by a language learner according to the assessment decision tree and providing corresponding feedback information.

It should be mentioned that when the language learner receives the feedback information from the assessment and diagnosis module 110 and tries to correct his/her pronunciation, the assessment and diagnosis module 110 is capable of comparing the decision path corresponding to the new pronunciation with the decision path corresponding to the previous pronunciation to further provide feedback information.

For example, when the language learner speaks again and raises the tone of the starting syllable in response to the feedback information of "your pitch started too low, descend not enough", the assessment and diagnosis module 110 outputs a feedback information of "descent is still not enough" after comparing the diagnosis paths corresponding to the two pronunciations. Namely, the uncorrected problem is further sent back to the language learner.

Figure 9:
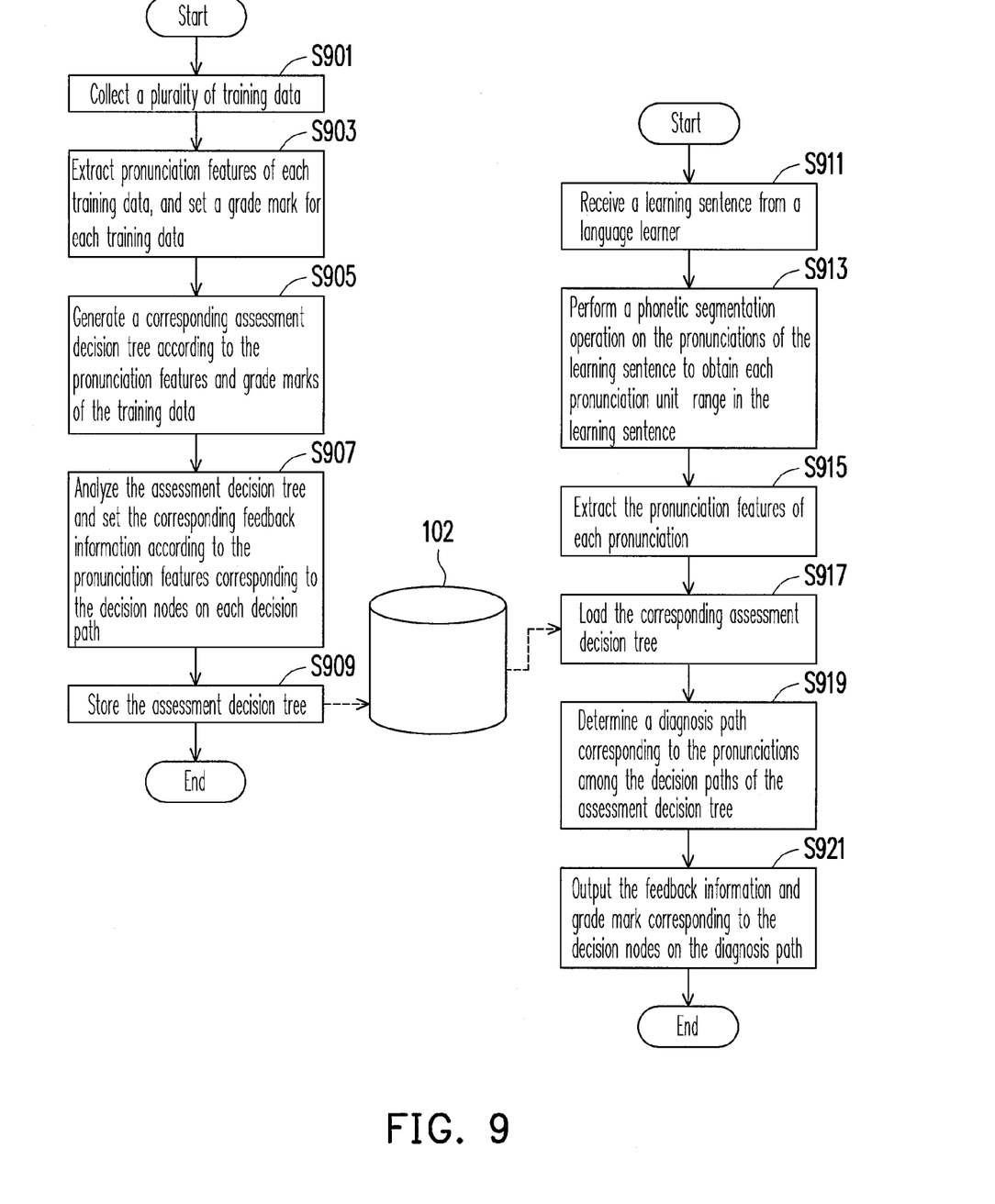
FIG. 9 is a flowchart of an integrated language learning method according to an exemplary embodiment of the present disclosure.

FIG. 9 is a flowchart of an integrated language learning method according to an exemplary embodiment of the present disclosure.

Referring to FIG. 9, first, in a pronunciation assessment procedure 900, a plurality of training data is collected (S901). As described above, the pronunciations of training sentences spoken by a language learner are collected through a recording module, and a pronunciation unit range of the pronunciations of each training sentence is obtained through a phonetic segmentation operation, and the pronunciation units are categorized and served as the training data. Particularly, in an exemplary embodiment, the training data is grouped into different training data groups according to its categories.

Then, in step S903, the feature extraction module 104 extracts the pronunciation features of each training data and sets a grade mark of each training data.

As described above, the feature extraction module 104 extracts a fundamental frequency contour of each training data and serves the first mean value, the second mean value, the third mean value, the first difference value, the second difference value, and the third difference value of the fundamental frequency contour as the corresponding pronunciation features.

Next, in step S905, the decision tree generation module 106 generates the corresponding assessment decision tree according to the pronunciation features and the grade marks of the training data. To be specific, the decision tree generation module 106 generates an assessment decision tree corresponding to each training data group. After that, in step S907, the feedback information generation module 108 analyzes the assessment decision trees and sets the corresponding feedback information according to the pronunciation features corresponding to the decision nodes on each decision path. The techniques for generating the assessment decision trees and setting the feedback information have been described above therefore will not be described herein.

Thereafter, in step S909, the assessment decision trees are stored.

After generating the assessment decision trees, in step S911, a learning sentence input by a language learner through a recording module (not shown) in the language learning system 100 is received. Then, in step S913, the feature extraction module 104 performs a phonetic segmentation operation on the pronunciations of the learning sentence to obtain each pronunciation unit range in the learning sentence. Besides, in step S915, the feature extraction module 104 extracts the pronunciation features of each pronunciation.

After that, in step S917, the assessment and diagnosis module 110 loads the corresponding assessment decision tree from the storage module 102 according to the training data group corresponding to the pronunciations. In step S919, the assessment and diagnosis module 110 determines a diagnosis path corresponding to the pronunciations among the decision paths in the corresponding assessment decision tree. Finally, in step S921, the assessment and diagnosis module 110 outputs the feedback information and the grade mark corresponding to the decision nodes on the diagnosis path.

According to an exemplary embodiment of the present disclosure, a computer program product is also provided, wherein the computer program product is composed of a plurality of program instructions. In particular, after these program instructions are loaded into a computer system and executed by the same, the steps in the integrated language learning method described above can be executed and the computer system can offer the function of the integrated language learning method In addition, the computer program product can be stored in a computer-readable recording medium and subsequently read by a computer system. The computer-readable recording medium may be any data storage device, such as a read-only memory (ROM), a random-access memory (RAM), a CD-ROM, a magnetic tape, a floppy disk, or an optical data storage device.

In summary, exemplary embodiments of the present disclosure provide an integrated language learning method and a language learning system, wherein training data of different language learner are collected in advance to generate corresponding assessment decision trees, and the pronunciation of a language learner is diagnosed according to information on a corresponding assessment decision tree. Thus, in the integrated language learning method and the language learning system provided by exemplary embodiments of the present disclosure, it is not needed to collect a large sample corpus to compare pronunciations. In addition, in the integrated language learning method and the language learning system provided by exemplary embodiments of the present disclosure, the words, phrases, and sentences pronounced by a language learner can be assessed. Thereby, using the language learning system is made very enjoyable to the language learner.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A language learning system, for assessing a pronunciation in a learning sentence, the language learning system comprising:
   a storage module, configured for storing a plurality of training data and at least one assessment decision tree generated according to the training data, wherein the assessment decision tree has a plurality of decision paths, each of the decision paths comprises a plurality of decision nodes and is corresponding to at least one feedback information, and the decision paths and decision nodes on the assessment decision tree represent a specific type of pronunciations having a plurality of pre-defined types of tones;
   a feature extraction module, configured for extracting at least one pronunciation feature of the pronunciation, wherein the feature extraction module is further configured for extracting at least one pronunciation feature of each of the training data, wherein the training data has at least one grade mark,
   a decision tree generation module, configured for generating the assessment decision tree according to the pronunciation features and the grade marks of the training data,
   a feedback information generation module, configured for analyzing each of the decision paths of the assessment decision tree according to the pronunciation features corresponding to the decision nodes on the decision path to identify incorrect pronunciation types represented by the decision nodes and setting the feedback information corresponding to the decision path according to the incorrect pronunciation types represented by the decision nodes; and
   an assessment and diagnosis module, is configured for determining a diagnosis path corresponding to the pronunciation among the decision paths of the assessment decision tree according to the pronunciation feature of the pronunciation and outputting the feedback information corresponding to the diagnosis path to correct at least one incorrect pronunciation in the learning sentence.

2. The language learning system according to claim 1, wherein the feature extraction module performs a phonetic segmentation operation on a plurality of training sentences to obtain a plurality of pronunciation units of the training sentences, and the feature extraction module obtains the training data from the pronunciation units of the training sentences,
   wherein the feature extraction module performs the phonetic segmentation operation on the learning sentence to obtain one or more pronunciation units of the learning sentence.

3. The language learning system according to claim 2, wherein the feature extraction module extracts a fundamental frequency contour of the pronunciation, divides the fundamental frequency contour of the pronunciation into a plurality of sub fundamental frequency contours of the pronunciation, calculates a mean value of each of the sub fundamental frequency contours of the pronunciation, calculates a slope of each of the sub fundamental frequency contours of the pronunciation, calculates a plurality of difference values between the sub fundamental frequency contours of the pronunciation, and serves at least one of the mean values, the slopes, and the difference values of the sub fundamental frequency contours of the pronunciation as the pronunciation feature of the pronunciation,
   wherein the feature extraction module extracts a fundamental frequency contour of each of the training data, divides the fundamental frequency contour of the training data into a plurality of sub fundamental frequency contours, calculates a mean value of each of the sub fundamental frequency contours of the training data, calculates a slope of each of the sub fundamental frequency contours of the training data, calculates a plurality of difference values between the sub fundamental frequency contours of the training data, and serves at least one of the mean values, the slopes, and the difference values of the sub fundamental frequency contours of the training data as the pronunciation feature of the training data.

4. The language learning system according to claim 2, wherein the feature extraction module extracts an energy contour of the pronunciation, divides the energy contour of the pronunciation into a plurality of sub energy contours of the pronunciation, calculates a mean value of each of the sub energy contours of the pronunciation, calculates a slope of each of the sub energy contours of the pronunciation, calculates a plurality of difference values between the sub energy contours of the pronunciation, and serves at least one of the mean values, the slopes, and the difference values of the sub energy contours of the pronunciation as the pronunciation feature of the pronunciation,
   wherein the feature extraction module extracts an energy contour of each of the training data, divides the energy contour of the training data into a plurality of sub energy contours, calculates a mean value of each of the sub energy contours of the training data, calculates a slope of each of the sub energy contours of the training data, calculates a plurality of difference values between the sub energy contours of the training data, and serves at least one of the mean values, the slopes, and the difference values of the sub energy contours of the training data as the pronunciation feature of the training data.

5. The language learning system according to claim 2, wherein the feature extraction module obtains a plurality of phonemes of the pronunciation to one or more mel-scale frequency cepstral coefficients (MFCCs) corresponding to the phonemes of the pronunciation, calculates a MFCC mean value of each of the phonemes, calculates a plurality of MFCC difference values between the MFCC mean values of the pronunciation, and serves at least one of the MFCC mean values and the MFCC difference values of the pronunciation as the pronunciation feature of the pronunciation,
wherein the feature extraction module extracts a plurality of MFCCs corresponding to the phonemes, calculates a MFCC mean value of each of the phonemes of the training data, calculates a plurality of MFCC difference values between the MFCC mean values of the training data, and serves at least one of the MFCC mean values and the MFCC difference values of the training data as the pronunciation feature of the training data.

6. The language learning system according to claim 2, wherein the feature extraction module extracts a plurality of durations corresponding to the phonemes of the pronunciation, calculates a mean duration of each of the phonemes, calculates a plurality of duration differences between the mean durations in the pronunciation, and serves at least one of the mean durations and the duration differences of the pronunciation as the pronunciation feature of the pronunciation,
wherein the feature extraction module extracts a plurality of phonemes of each of the training data and a plurality of durations corresponding to the phonemes, calculates a mean duration of each of the phonemes of the training data, calculates a plurality of duration differences between the mean durations in the training data, and serves at least one of the mean durations and the duration differences of the training data as the pronunciation feature of the training data.

7. The language learning system according to claim 2, wherein the feature extraction module extracts at least one fundamental frequency contour, at least one energy contour, at least one MFCC, and at least one duration corresponding to the pronunciation and serves at least one of the fundamental frequency contour, the energy contour, the MFCC, and the duration as the pronunciation feature of the pronunciation,
wherein the feature extraction module extracts at least one fundamental frequency contour, at least one energy contour, at least one MFCC, and at least one duration corresponding to each of the training data and serves at least one of the fundamental frequency contour, the energy contour, the MFCC, and the duration as the pronunciation feature of the training data.

8. The language learning system according to claim 2, wherein the feature extraction module groups the training data into a plurality of training data groups according to combinations of each pronunciation unit and the next pronunciation unit in the training sentences,
wherein the decision tree generation module generates the assessment decision trees according to the training data groups, and each of the assessment decision trees is corresponding to one of the training data groups.

9. The language learning system according to claim 2, wherein the feature extraction module groups the training data into a plurality of training data groups according to combinations of each pronunciation unit and the previous pronunciation unit in the training sentences,
wherein the decision tree generation module generates the assessment decision trees according to the training data groups, and each of the assessment decision trees is corresponding to one of the training data groups.

10. The language learning system according to claim 2, wherein the feature extraction module groups the training data into a plurality of training data groups according to combinations of each pronunciation unit, the next pronunciation unit and the previous pronunciation unit in the training sentences,
wherein the decision tree generation module generates the assessment decision trees according to the training data groups, and each of the assessment decision trees is corresponding to one of the training data groups.

11. A language learning method, for assessing a pronunciation in a learning sentence, the language learning method comprising:
collecting a plurality of training data;
extracting at least one pronunciation feature of each of the training data, wherein the training data has at least one grade mark;
generating at least one assessment decision tree according to the pronunciation features and the grade marks of the training data, wherein the assessment decision tree has a plurality of decision paths, each of the decision paths comprises a plurality of decision nodes, and the decision paths and the decision nodes on the assessment decision tree represent a specific type of pronunciations having a plurality of predefined types of tones;
analyzing each of the decision paths of the assessment decision tree according to the pronunciation features corresponding to the decision nodes on each of the decision path to identify incorrect pronunciation types represented by the decision nodes and setting feedback information corresponding to the decision path according to the incorrect pronunciation types represented by the decision nodes;
extracting at least one pronunciation feature of the pronunciation;
determining a diagnosis path corresponding to the pronunciation among the decision paths of the assessment decision tree according to the pronunciation feature of the pronunciation; and
outputting the feedback information corresponding to the diagnosis path to correct at least one incorrect pronunciation in the learning sentence.

12. The language learning method according to claim 11, wherein the step of extracting the pronunciation feature of each of the training data comprises:
collecting a plurality of training sentences;
performing a phonetic segmentation operation on the training sentences to obtain a plurality of pronunciation units of the training sentences; and
obtaining the training data from the pronunciation units.

13. The language learning method according to claim 12 further comprising:
receiving the learning sentence; and
performing the phonetic segmentation operation on the learning sentence to obtain one or more pronunciation units of the learning sentence,
wherein the pronunciation is one of the pronunciation units of the learning sentence.

14. The language learning method according to claim 12, wherein the step of extracting the pronunciation feature of the pronunciation comprises:

getting a fundamental frequency contour of the pronunciation;
dividing the fundamental frequency contour of the pronunciation into a plurality of sub fundamental frequency contours;
calculating a mean value of each of the sub fundamental frequency contours of the pronunciation;
calculating a slope of each of the sub fundamental frequency contours of the pronunciation;
calculating a plurality of difference values between the sub fundamental frequency contours of the pronunciation;
serving at least one of the mean values, the slopes, and the difference values of the sub fundamental frequency contours of the pronunciation as the pronunciation feature of the pronunciation,
wherein the step of extracting the pronunciation feature of each of the training data comprises:
getting a fundamental frequency contour of each of the training data;
dividing the fundamental frequency contour of each of the training data into a plurality of sub fundamental frequency contours;
calculating a mean value of each of the sub fundamental frequency contours of each of the training data;
calculating a slope of each of the sub fundamental frequency contours of each of the training data;
calculating a plurality of difference values between the sub fundamental frequency contours of each of the training data; and
serving at least one of the mean values, the slopes, and the difference values of the sub fundamental frequency contours of each of the training data as the pronunciation feature of the training data.

15. The language learning method according to claim 12, wherein the step of extracting the pronunciation feature of the pronunciation comprises:
getting an energy contour of the pronunciation;
dividing the energy contour of the pronunciation into a plurality of sub energy contours;
calculating a mean value of each of the sub energy contours of the pronunciation;
calculating a slope of each of the sub energy contours of the pronunciation;
calculating a plurality of difference values between the sub energy contours of the pronunciation;
serving at least one of the mean values, the slopes, and the difference values of the sub energy contours of the pronunciation as the pronunciation feature of the pronunciation,
wherein the step of extracting the pronunciation feature of each of the training data comprises:
getting an energy contour of each of the training data;
dividing the energy contour of each of the training data into a plurality of sub energy contours;
calculating a mean value of each of the sub energy contours of each of the training data;
calculating a slope of each of the sub energy contours of each of the training data;
calculating a plurality of difference values between the sub energy contours of each of the training data; and
serving at least one of the mean values, the slopes, and the difference values of the sub energy contours of each of the training data as the pronunciation feature of the training data.

16. The language learning method according to claim 12, wherein the step of extracting the pronunciation feature of the pronunciation comprises:
extracting a plurality of phonemes of the pronunciation and a plurality of MFCCs corresponding to the phonemes of the pronunciation;
calculating a MFCC mean value of each of the phonemes;
calculating a plurality of MFCC difference values between the MFCC mean values of the pronunciation; and
serving at least one of the MFCC mean values and the MFCC difference values of the pronunciation as the pronunciation feature of the pronunciation,
wherein the step of extracting the pronunciation features of the training data comprises:
extracting a plurality of phonemes of each of the training data and a plurality of MFCCs corresponding to the phonemes; and
calculating a MFCC mean value of each of the phonemes of each of the training data;
calculating a plurality of MFCC difference values between the MFCC mean values of each of the training data; and
serving at least one of the MFCC mean values and the MFCC difference values of each of the training data as the pronunciation feature of the training data.

17. The language learning method according to claim 12, wherein the step of extracting the pronunciation feature of the pronunciation comprises:
extracting a plurality of phonemes of the pronunciation and a plurality of durations corresponding to the phonemes of the pronunciation;
calculating a mean duration of each of the phonemes;
calculating a plurality of duration differences between the mean durations in the pronunciation; and
serving at least one of the mean durations and the duration differences of the pronunciation as the pronunciation feature of the pronunciation,
wherein the step of extracting the pronunciation feature of each of the training data comprises:
extracting a plurality of phonemes of each of the training data and a plurality of durations corresponding to the phonemes;
calculating a mean duration of each of the phonemes of each of the training data;
calculating a plurality of duration differences between the mean durations in each of the training data; and
serving at least one of the mean durations and the duration differences of each of the training data as the pronunciation feature of the training data.

18. The language learning method according to claim 12, wherein the step of extracting the pronunciation feature of the pronunciation comprises:
extracting at least one fundamental frequency contour, at least one energy contour, at least one MFCC, and at least one duration corresponding to the pronunciation; and
serving one of the fundamental frequency contour, the energy contour, the MFCC, and the duration as the pronunciation feature of the pronunciation,
wherein the step of extracting the pronunciation feature of each of the training data comprises:
extracting at least one fundamental frequency contour, at least one energy contour, at least one MFCC, and at least one duration corresponding to each of the training data; and
serving at least one of the fundamental frequency contour, the energy contour, the MFCC, and the duration of each of the training data as the pronunciation feature of the training data.

19. The language learning method according to claim 12 further comprising:

grouping the training data into a plurality of training data groups according to combinations of each pronunciation unit and the next pronunciation unit in the training sentences; and generating the assessment decision trees according to the training data groups, wherein each of the assessment decision trees is corresponding to one of the training data groups.

20. The language learning method according to claim 12 further comprising:

grouping the training data into a plurality of training data groups according to combinations of each pronunciation unit and the previous pronunciation unit in the training sentences; and generating the assessment decision trees according to the training data groups, wherein each of the assessment decision trees is corresponding to one of the training data groups.

21. The language learning method according to claim 12 further comprising:

grouping the training data into a plurality of training data groups according to combinations of each pronunciation unit, the next pronunciation unit and the previous pronunciation unit in the training sentences; and generating the assessment decision trees according to the training data groups, wherein each of the assessment decision trees is corresponding to one of the training data groups.

22. A non-transitory program product, comprising at least one program instruction, wherein the at least one program instruction when executed by a computer system performing a language learning method comprising:

collecting a plurality of training data;

extracting at least one pronunciation feature of each of the training data, wherein the training data has at least one grade mark;

generating at least one assessment decision tree according to the pronunciation features and the grade marks of the training data, wherein the assessment decision tree has a plurality of decision paths, each of the decision paths comprises a plurality of decision nodes, and the decision paths and the decision nodes on the assessment decision tree represent a specific type of pronunciations having a plurality of predefined types of tones;

analyzing each of the decision paths of the assessment decision tree according to the pronunciation features corresponding to the decision nodes on each of the decision path to identify incorrect pronunciation types represented by the decision nodes and setting feedback information corresponding to the decision path according to the incorrect pronunciation types represented by the decision nodes;

storing at least one assessment decision tree;

extracting at least one pronunciation feature of the pronunciation;

determining a diagnosis path corresponding to the pronunciation among the decision paths of the assessment decision tree according to the pronunciation feature of the pronunciation; and outputting the feedback information corresponding to the diagnosis path to correct at least one incorrect pronunciation in the learning sentence.

\* \* \* \* \*